US007891798B2

(12) United States Patent
Andrews et al.

(10) Patent No.: US 7,891,798 B2
(45) Date of Patent: Feb. 22, 2011

(54) MICRO-FLUIDIC DEVICE HAVING AN IMPROVED FILTER LAYER AND METHOD FOR ASSEMBLING A MICRO-FLUIDIC DEVICE

(75) Inventors: John Richard Andrews, Fairport, NY (US); Terrance Lee Stephens, Molalla, OR (US)

(73) Assignee: Xerox Corporation, Norwalk, CT (US)

( * ) Notice: Subject to any disclaimer, the term of this patent is extended or adjusted under 35 U.S.C. 154(b) by 133 days.

(21) Appl. No.: 12/185,384

(22) Filed: Aug. 4, 2008

(65) Prior Publication Data

US 2010/0025322 A1 Feb. 4, 2010

(51) Int. Cl.
*B41J 2/175* (2006.01)
*B01D 39/00* (2006.01)

(52) U.S. Cl. ............................ 347/93; 347/45; 347/92; 210/500.39

(58) Field of Classification Search ............ 210/500.39, 210/321.75, 321.84, 483, 488, 496, 499; 347/93
See application file for complete search history.

(56) References Cited

U.S. PATENT DOCUMENTS

| | | | | |
|---|---|---|---|---|
| 4,678,529 | A | 7/1987 | Drake et al. | |
| 6,139,674 | A | 10/2000 | Markham et al. | |
| 6,199,980 | B1 | 3/2001 | Fisher et al. | |
| 6,464,347 | B2 | 10/2002 | Kneezel et al. | |
| 6,779,877 | B2 * | 8/2004 | Andrews | 347/65 |
| 6,951,383 | B2 * | 10/2005 | Giere et al. | 347/56 |

OTHER PUBLICATIONS

Brennen, R., Laser-Ablated Microfluidics for Nanoflow Life Science Measurements, 2007, Agilent Laboratories.*

* cited by examiner

*Primary Examiner*—Krishnan S Menon
*Assistant Examiner*—Allison Gionta
(74) *Attorney, Agent, or Firm*—Maginot, Moore & Beck LLP

(57) ABSTRACT

A method for assembling a micro-fluidic device better preserves the integrity of a filter in a filter layer and simplifies the bonding of the filter layer to the channel layers on each side of the filter layer. The method includes aligning a polymer layer having a plurality of filter elements and a plurality of fluid passages arranged between the filter elements between two substrates of a micro-fluidic device, and bonding the polymer layer between the two substrates to seal an area between the filter elements and the fluid passages to enable fluid flow through the filter elements to be segregated from fluid flow through the fluid passages.

16 Claims, 3 Drawing Sheets

MICRO-FLUIDIC DEVICE HAVING AN IMPROVED FILTER LAYER AND METHOD FOR ASSEMBLING A MICRO-FLUIDIC DEVICE

TECHNICAL FIELD

This disclosure relates generally to micro-fluidic devices that eject fluid from a liquid supply in the device and, more particularly, to printheads that eject ink onto imaging substrates.

BACKGROUND

Many small scale liquid dispensing devices, sometimes called micro-fluidic devices, are known. These devices include micro-electromechanical system (MEMS) devices, electrical semiconductor devices, and others. These devices are small, typically in the range of 500 microns down to as small as 1 micron or even smaller. These devices are important in a wide range of applications that include drug delivery, analytical chemistry, microchemical reactors and synthesis, genetic engineering, and marking technologies including a range of ink jet technologies, such as thermal ink jet and piezoelectric ink jet. Many of these devices have one or more layers that filter fluid flowing through the devices. These filters help keep nozzles and channels free of clogs caused by particle contaminants and air bubbles carried into the printhead from upstream liquid sources.

In some of these micro-fluidic devices, the filter layers are fabricated with polymer films and in others, the filter layer is made from a thin metal layer. Examples of polymer films useful for filter layers include polyimides, such as Kapton™ or Upilex™, polyester, polysulfone, polyetheretherketone, polyphenelyene sulfide, and polyethersulfone. Metal filters may be made from stainless steel, nickel electroformed screens, or woven mesh screens. The filter layer may be laser ablated or chemically etched to produce the filter pores. These pores are required to be smaller in diameter than the final aperture through which the fluid passes so they block the passage of contaminants that might block the final aperture. Ancillary structure may also be provided to redirect fluid flow to another portion of the filter in the event that a portion of the filter becomes clogged. In some micro-fluidic devices, the final aperture may be approximately 20-50 microns. Typically, the filter pores are 5-10 microns smaller than the final opening. Care must be taken in the pore production process to ensure the placement and sizing of the pores are within these relatively tight tolerance ranges.

After a filter layer is produced, it is mounted in a micro-fluidic device between two substrates, which are typically made of stainless steel or silicon. A number of methods are frequently used for the mounting of the filter. For example, a filter may be brazed, ultrasonically bonded, or anodically bonded with the lack of adhesive between the substrates. Alignment of the filter with an inlet in a substrate on one side of the filter and with an outlet in a substrate on the other side of the filter must be accomplished with some precision. Otherwise, fluid flow through the filter may be impeded.

A filter layer may alternatively be mounted between substrates by applying adhesive to both surfaces of the filter layer before aligning the filter layer between two substrates. Application of the adhesive requires attention as the adhesive may clog pores in the filter if the adhesive directly contacts the filter pores. Additionally, the adhesive is typically applied to one surface of the filter layer or the mating substrate, and then the filter layer is pressed against a substrate. After the adhesive is cured, adhesive is then applied to the other filter surface or other substrate, the other substrate is pressed against the filter layer surface, and the adhesive cured. Thus, assembling a micro-fluidic device with a filter layer requires separate adhesives, assembly steps, and curing steps for each interface.

While the above-described processes are effective for producing and mounting filter layers in micro-fluidic devices, they do require a number of distinct steps and careful control. Accordingly, development of more robust processes for making and mounting filters in micro-fluidic devices is desirable.

SUMMARY

A method for assembling a micro-fluidic device better preserves the integrity of a filter in a filter layer and simplifies the bonding of the filter layer to the substrates on each side of the filter layer. The method includes aligning a polymer layer having a plurality of filter elements and a plurality of fluid passages arranged between the filter elements between two substrates of a micro-fluidic device, and bonding the polymer layer between the two substrates to seal an area between the filter elements and the fluid passages to enable fluid flow through the filter elements to be segregated from fluid flow through the fluid passages.

A filter constructed for use in the method for assembling a micro-fluidic device enables filter elements in the filter layer to maintain integrity for fluid flow. The filter layer includes a polymer layer in which a plurality of filter elements have been formed, each filter element having a predetermined configuration, and at least one fluid passage formed between adjacent filter elements and the at least one fluid passage being outside a boundary of the predetermined configuration of each adjacent filter element. The filter may be made by a hybrid process in which the outline of the filter layer and large scale features in the filter layer are cut in a polymer layer, and a plurality of filter elements are formed in the polymer layer by laser ablation.

BRIEF DESCRIPTION OF THE DRAWINGS

The foregoing aspects and other features of an improved filter layer and how the improved filter layer facilitates micro-fluidic device assembly are explained in the following description, taken in connection with the accompanying drawings.

DETAILED DESCRIPTION

Figure 1:
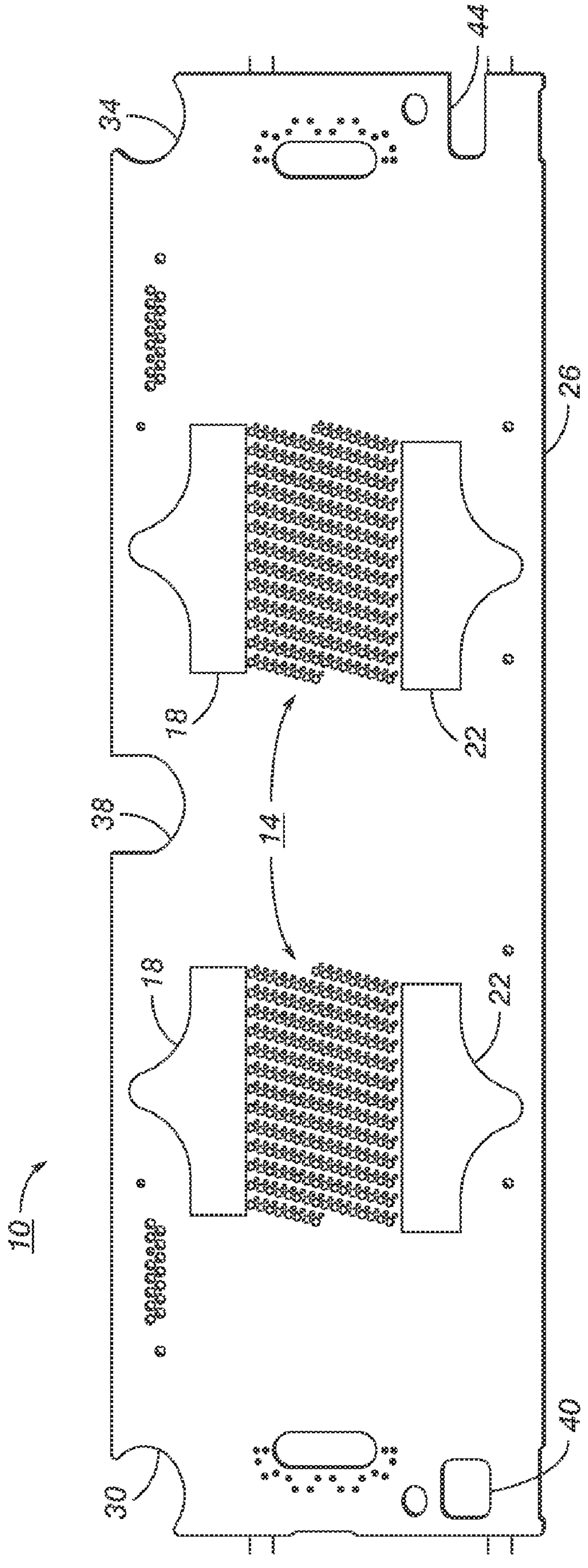
FIG. 1 is a front plan view of a filter layer that facilitates assembly of a micro-fluidic device.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multifunction machine, etc. In the description below, reference is made in the text and the drawings to an ink jet stack; however, the discussion is applicable to other micro-fluidic devices that dispense liquid or pump fluid. Therefore, the description should not be read to limit the application of the method to ink jet stacks alone.

FIG. 1 depicts a filter layer 10 having two filter areas 14 with each filter having an upper manifold 18 and a lower manifold 22 adjacent to the filter. The perimeter 26 of the filter layer 10 is cut with features, such as cutouts 30, 34, and recess 38. These features enable the filter layer 10 to follow the contours of the substrates (not shown) to which the filter layer is bonded. Additionally, a rectangular opening 40 and an elongated elliptical slot 44 are cut in the filter layer 10 to aid with the alignment and the substrates.

The filter layer 10 may be cut from a thermoset polymer material, such as a polyimide or a thermoplastic polymer. Such materials include thermoplastic polyimide, polyester, polysulfone, polyetheretherketone, polyphenelyene sulfide, and polyethersulfone. Alternatively, the filter layer 10 may include a polymer core with an adhesive on each side. Examples of polymer cores include polyimide, polyester, polysulfone, polyetheretherketone, polyphenelyene sulfide, and polyethersulfone. The adhesive may be a b-staged (partially cured) adhesive, such as epoxy, acrylic, or phenolic adhesives, although other types of adhesives may be used. In another embodiment, the core may be a thermoset polyimide with a thermoplastic polyimide adhesive layer on each side. In embodiments in which each side of the thermoset polymer material has an adhesive coating, the coatings need not be the same. The filter layer 10 is formed with an adhesive coating, if one is used, before the filter pores are formed in the layer. This type of filter layer fabrication helps ensure that the adhesive does not clog or otherwise interfere with the filter pores.

Figure 2:
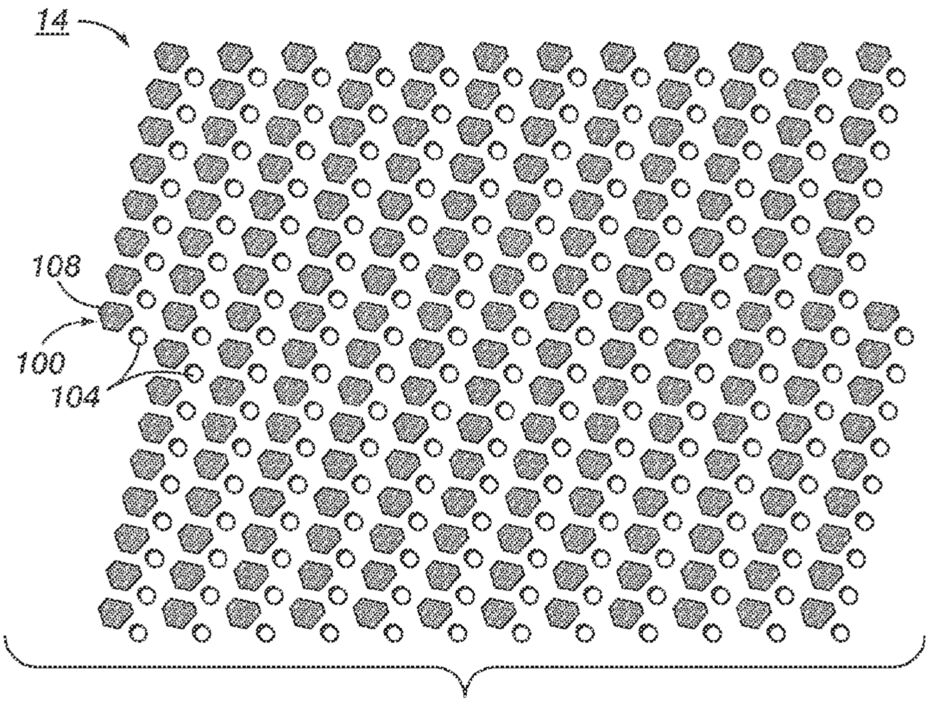
FIG. 2 is an enlarged view of the array of filter elements and the array of fluid passages formed in the filter layer of FIG. 1.

A portion of one of the filter areas 14 is shown in FIG. 2. The filter 14 includes an array of filter elements 100 and an array of fluid passages 104 that are interspersed within the filter area 14. A filter element is a configuration of a plurality of filter pores within a boundary as described in more detail below. The fluid passages enable fluid flow through the filter layer 10 that is segregated from the fluid flow through the filter elements 100. Thus, fluid does not migrate between a filter element and a fluid passage within the filter layer 10. Consequently, the perimeter 108 of the filter elements 100 must be sealed to ensure that fluid does not migrate from a filter element to a fluid passage. The perimeter 108 is shown for illustration of the filter boundary, though it need not be defined as a physical structure. In previously known micro-fluidic devices, fluid passages 104 were not interspersed with a plurality of filter elements in a polymer. In some micro-fluidic devices, each filter element corresponds to one final aperture for expulsion of the fluid from the micro-fluidic device. Therefore, the height and width of each filter element are sufficient to enable adequate fluid flow through a filter element without presenting too great a resistance to the fluid flow. Alternatively, a larger filter element can replace the smaller individual filters.

Figure 3:
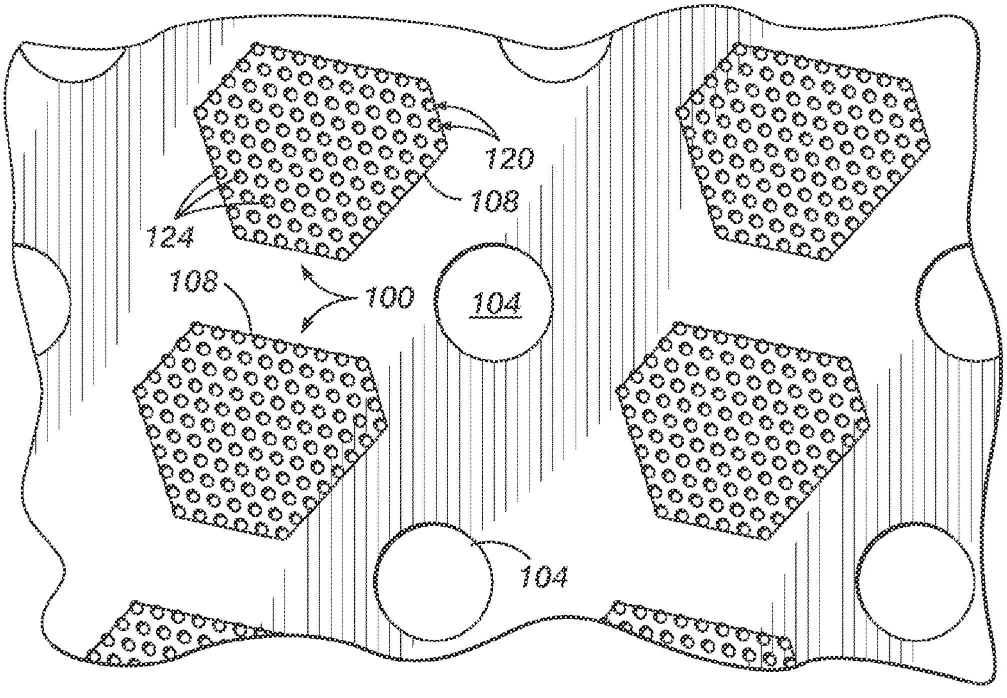
FIG. 3 is an enlarged view showing the pore structure of the filter elements in FIG. 2.

The filter elements 100 and the fluid passages 104 are shown in an enlarged view in FIG. 3. Each filter element 100 includes an array 120 of filter pores 124. The filter pores 124 are shown as being circular, however, other shapes may be used. The hexagonal closely packed arrangement of the filter elements in the array as shown maximizes the number of pores that can be placed in a given area. Rectangular and other arrangements, however, may also be used. The arrays 120 are also shown as being configured with hexagonal perimeters 108, although other perimeter shapes may be used. Also, the hexagonal shape of the arrays 120 in FIG. 3 are depicted as being non-symmetrical hexagons, but symmetrical hexagons may be used as well. Likewise, the fluid passages 104 are depicted as being circular, although other shapes may be used. The filter pores are formed in the filter layer 10 using a laser ablation process. Such a process uses a lithographic mask containing the filter design including the fluid passages. This mask is imaged onto the polymer film and an excimer laser is used in an imaging mode to illuminate the mask image on the surface of the polymer. In areas where the mask is not present, the laser removes the unprotected material to produce a fluid passage through the material. In this manner, filter pores 124 that are less than 0.05 mm in diameter may be produced within each filter element. Alternatively, the pores can be made by a laser drilling process using a scanned laser system in which the pores are formed individually by a point and drill process or by scanning a small circle for each pore.

Figure 4:
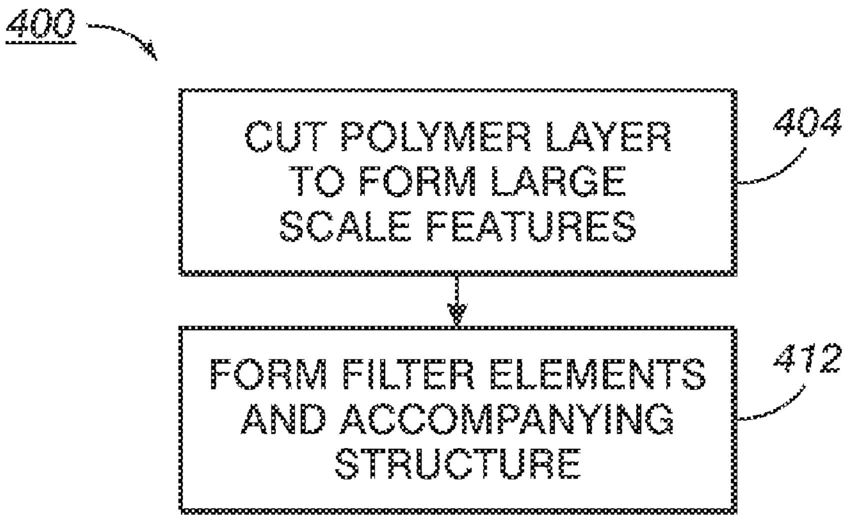
FIG. 4 is a flow diagram of a process for making a filter layer having an array of fluid passages interspersed with an array of filter elements.

To produce a filter layer 10 for a micro-fluidic device, a process, such as process 400 shown in FIG. 4, is performed. The starting material is either a polymer film that is self-adhesive, such as a thermoplastic material, or a polymer film having a partially cured, b-staged, adhesive, which has been deposited as a thin layer on the film. A sheet of polymer material is cut with a perimeter compatible for bonding to adjacent substrates in the device (block 404). This cutting may be done with a die tool or with a laser, for example, a scanned laser beam. This cutting not only forms the perimeter with a compatible shape for bonding to other substrates, but it also forms large scale features in the layer. Large scale features are structures, such as fluid directing structures, that have at least one dimension that measures at least 40 microns. Such large scale features also include the perimeter, cutouts, and recesses in the layer shown in FIG. 1 above, but also the alignment features depicted in the same figure. The pores for the filter elements and the fluid flow structure are formed with the laser ablation process described above (block 412). While the process of FIG. 4 may be performed in the order shown in FIG. 4, the filter elements and fluid flow structure may be formed first before the outline and large scale features are cut. Also, as noted above, the pores in the filter array may be formed with the same scanned laser that cuts the layer perimeter and other fluid flow features, although a different scanned laser may be used.

Figure 5:
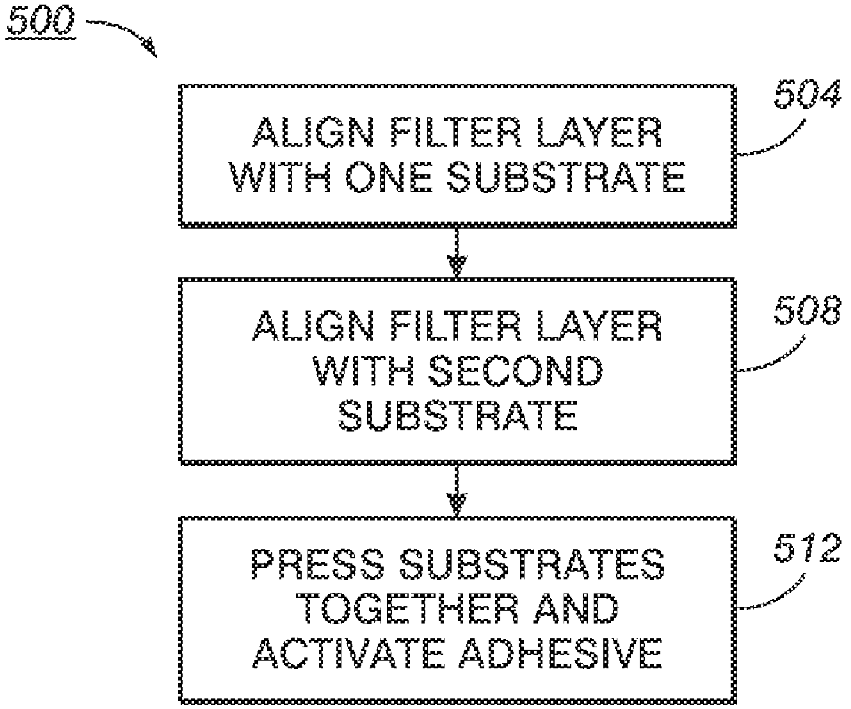
FIG. 5 is a flow diagram of a process for assembling a filter layer in a micro-fluidic device.

After the filter layer has been fabricated with its large scale features and filter elements, it may be bonded to the adjacent substrates. A process to perform this bonding is shown in FIG. 5. The process 500 begins by aligning the filter layer with one of the adjacent substrates (block 504). This alignment includes aligning the outline of the filter layer 10 with the outline of the adjacent substrate and fitting the alignment features around protuberances or other structure on the adjacent substrate. In a similar manner, the layer is aligned with the other adjacent substrate (block 508). The substrates are then pressed together and the adhesive is activated (block 512). Activation of the adhesive may be achieved by pressure alone, heating the adhesive alone, or both. If the adhesive on each surface of the filter layer is different, then an activation method corresponding to the type of adhesive may be used, either serially or simultaneously. If a single layer polymer without adhesives is used, the sandwich of the filter layer and two adjacent substrates is heated so the filter layer reaches its glass transition temperature. The two adjacent layers are then pressed together so the filter layer conforms to the surfaces of the two adjacent substrates. Once the filter layer cools, the adjacent substrates are bonded to the filter layer.

In operation, filter layers are cut from a polymer material that is either self-adhesive thermoplastic polymer or coated with thermoplastic or thermoset adhesives on both sides of the material with an appropriate outline and large scale features. This operation enables filter layers to be produced in relatively large numbers. The filter layers are also laser ablated to form the filter elements. As noted above, the order of these operations may be reversed depending upon whether adhesive is used and the properties of the adhesive. The filter layer may then be aligned between two adjacent substrates, the three layers pressed together, and the adhesive activated so the bonding of the substrates to the filter layer is completed. This bonding effectively seals the filter elements from the other fluid directing features in the filter layer. The ability to segregate fluid flow elements within a filter layer to support bi-directional fluid flow through the filter layer may be used to simply the design of a micro-fluidic device.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A filter for a micro-fluidic device comprising:

a polymer layer having a first and a second side;

a plurality of filter elements formed in the polymer layer, each filter element having a plurality of pores arranged in an array having a predetermined perimeter, each filter element being separated from the other filter elements formed in the polymer layer and configured to filter fluid flow to only one aperture in another layer in a micro-fluidic device in which the polymer layer is bonded; and a plurality of fluid passages formed in the polymer layer, each fluid passage extending through the polymer layer and being positioned between the perimeters of the filter elements in the polymer layer to separate each fluid passage from the other fluid passages in the plurality of fluid passages and from each filter element in the polymer layer to seal the fluid passages and the filter elements from fluid communication in the polymer layer from one another by bonding of a first layer to the first side of the polymer layer and of a second layer to the second side of polymer layer.

2. The filter of claim 1 further comprising:

at least one large scale feature formed in the polymer layer.

3. The filter of claim 1 further comprising:

a layer of partially cured adhesive on both sides of the polymer layer, the layer of partially cured adhesive segregating each fluid passage from the other fluid passages in the plurality of fluid passages and from the filter elements in the polymer layer in response to the partially cured adhesive being cured to bond the first side of the polymer layer to the first layer and the second side of the polymer layer to the second layer.

4. The filter of claim 3 wherein the partially cured adhesive is one of an epoxy, an acrylic, and a phenolic adhesive.

5. The filter of claim 1 wherein the polymer layer is a polyimide.

6. The filter of claim 5 wherein the polymer layer is a thermoset polyimide and the filter further comprises:

a thermoplastic polyimide adhesive on each side of the thermoset polyimide.

7. The filter of claim 1 wherein the polymer layer is a single thermoplastic polymer that softens in response to the material being heated to a glass transition temperature.

8. An inkjet printhead comprising:

a polymer layer having a filter area;

a plurality of filter elements formed within the filter area, each filter element having a plurality of pores arranged in an array having a predetermined perimeter, each filter element being separated from the other filter elements formed in the polymer layer and configured to filter fluid flow to only one aperture in another layer in a micro-fluidic device in which the polymer layer is bonded;

a plurality of fluid passages formed within the filter area of the polymer layer and extending through the polymer layer, each fluid passage in the plurality of fluid passages being formed outside the perimeter of each filter element in the polymer layer to separate each fluid passage from the other fluid passages in the plurality of fluid passages and from each filter element in the polymer layer;

a first layer bonded to one side of the polymer layer; and a second layer bonded to a second side of the polymer layer, the bonding of the first layer to the first side of the polymer layer and the bonding of the second layer to the second side of polymer layer sealing each fluid passage from fluid communication in the polymer layer with the other fluid passages and from fluid communication with the filter elements in the polymer layer.

9. The inkjet printhead of claim 8 wherein each pore in the plurality of pores has a diameter of no more than 0.05 mm.

10. The inkjet printhead of claim 8 wherein the plurality of pores for each filter element is positioned within a hexagonal perimeter.

11. The inkjet printhead of claim 10 wherein the hexagonal perimeter formed by the array of pores for each filter element is asymmetrical.

12. The inkjet printhead of claim 8 wherein each fluid passage is a cylindrical bore through the polymer layer.

13. The filter of claim 1 wherein each pore in the plurality of pores of each filter element has a diameter of no more than 0.05 mm.

14. The filter of claim 1 wherein the perimeter of the array of pores for each filter element is a hexagonal perimeter.

15. The filter of claim 14 wherein the hexagonal perimeter is asymmetrical.

16. The filter of claim 1 wherein each fluid passage is a cylindrical bore through the polymer layer.

* * * * *